(12) United States Patent
Graffin et al.

(10) Patent No.: US 6,785,694 B1
(45) Date of Patent: Aug. 31, 2004

(54) DEFINING A SEQUENCE OF FILES IN THE SAME FILE CONTAINER BY PLACING A NUMERICAL VALUE IN A HEADER OF THE FILE

(75) Inventors: Brett Graffin, Scottsdale, AZ (US); John Dunn, Chandler, AZ (US); Thomas J. Dimitri, Phoenix, AZ (US)

(73) Assignee: Autodesk, Inc., San Rafael, CA (US)

( * ) Notice: Subject to any disclaimer, the term of this patent is extended or adjusted under 35 U.S.C. 154(b) by 82 days.

(21) Appl. No.: 10/044,862

(22) Filed: Oct. 22, 2001

Related U.S. Application Data

(60) Provisional application No. 60/242,217, filed on Oct. 20, 2000.

(51) Int. Cl.$^7$ ............................................. G06F 17/30
(52) U.S. Cl. ..................... 707/203; 707/102; 707/205; 707/104.1; 713/186
(58) Field of Search .............................. 707/100.3, 102, 707/104.1, 203, 205, 103 R, 101; 370/389, 399, 535, 536; 710/5; 713/186

(56) References Cited

U.S. PATENT DOCUMENTS

| | | | |
|---|---|---|---|
| 5,819,283 A | * 10/1998 | Turkowski | 707/103 R |
| 5,832,493 A | * 11/1998 | Marshall et al. | 707/101 |
| 5,850,566 A | * 12/1998 | Solan et al. | 710/5 |
| 6,023,478 A | * 2/2000 | Kilk et al. | 370/535 |
| 6,205,457 B1 | * 3/2001 | Hurwitz | 707/103 R |
| 6,292,795 B1 | * 9/2001 | Peters et al. | 707/3 |
| 6,438,145 B1 | * 8/2002 | Movshovich et al. | 370/536 |
| 6,636,844 B2 | * 10/2003 | Yoneyama | 707/1 |
| 2001/0054154 A1 | * 12/2001 | Tam | 713/186 |

* cited by examiner

*Primary Examiner*—Charles Rones
(74) *Attorney, Agent, or Firm*—Gates & Cooper LLP

(57) ABSTRACT

A method and system for defining a sequence of files by placing a numerical value in the header of the file, without using an index. Newly-positioned files are positioned between existing files by the determination and assignment of a numerical value between the numerical values of the previous and succeeding existing files.

9 Claims, 1 Drawing Sheet

DEFINING A SEQUENCE OF FILES IN THE SAME FILE CONTAINER BY PLACING A NUMERICAL VALUE IN A HEADER OF THE FILE

CROSS REFERENCE TO RELATED APPLICATIONS

Priority is claimed to U.S. provisional patent application No. 60/242,217, filed on Oct. 20, 2000, which is hereby incorporated by reference.

BACKGROUND OF THE INVENTION

In some applications where files of information or data is stored and manipulated by a computer, the order of the presentation of the files is important. For example, in a system which stores and manipulates architectural and construction drawings and other data, with each drawing constituting a separate data file, the precise order of the presentation of the files is important, as is the ability to change the order and to incorporate new files into an existing order.

One way, known in the art, to construct an ordering of files is to create an index file. The index file is a list of pointers to the data files. A change made to the index file will change the order of presentation of the data files. Disadvantages of using an index file are that the separate index file has to be maintained and that corruption of the index file will hurt the usefulness of the system. Also, in an environment where many concurrent users are accessing, changing, and reordering data files, such as in an Internet-based system, concurrent updating of an index. file is not possible in some cases and presents difficulties in others.

SUMMARY OF THE INVENTION

Our invention overcomes the problems of the prior art by providing a method for defining a sequence of files by placing a numerical value in a header of the file. The numerical value assigned to each file is obtained in such a way as to substantially decrease the likelihood that a reassignment of all numerical values will become necessary.

DETAILED DESCRIPTION

Figure 1:
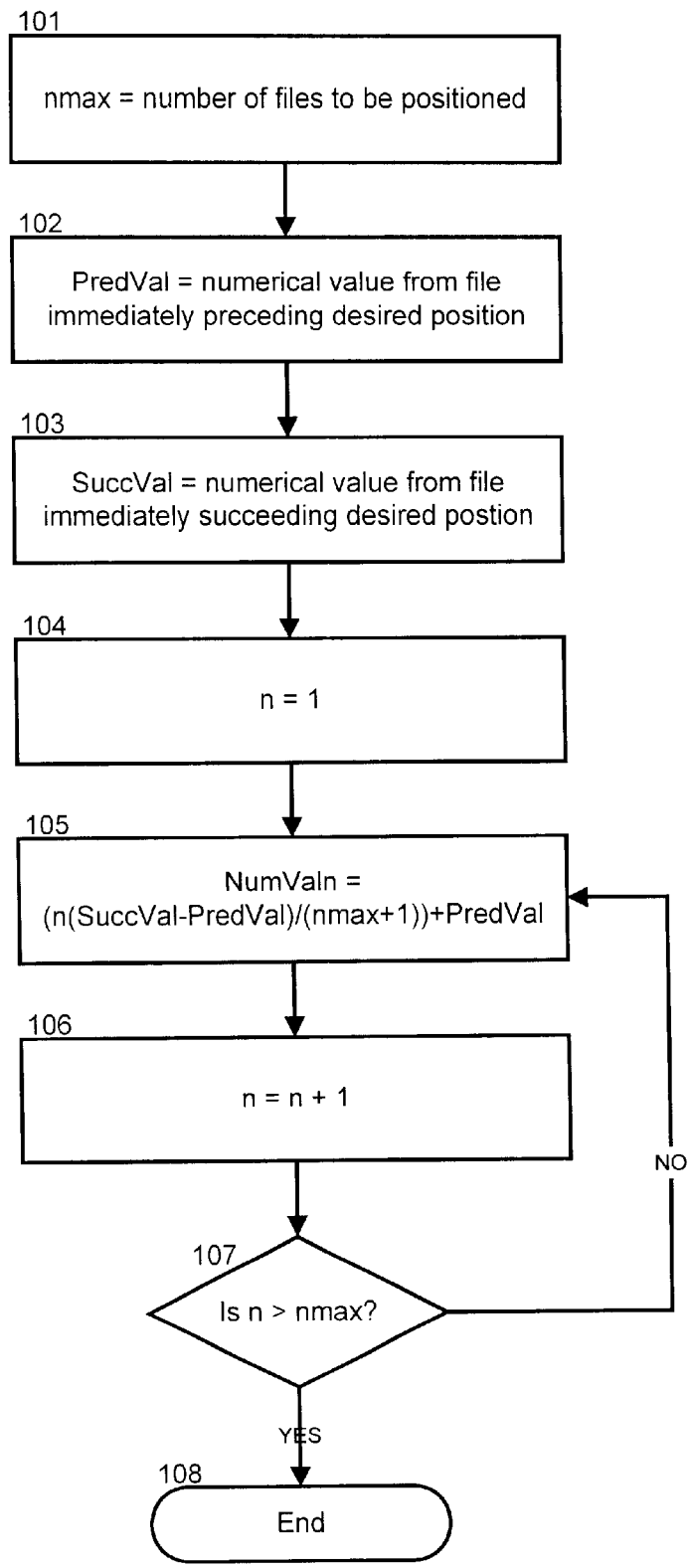
FIG. 1 is a flowchart showing the method of the invention.

In a preferred embodiment of our invention, a system which maintains a collection of data files, and which processes or presents those data files in a changeable order, maintains the order of and defines the sequence of the data files by placing a numerical value in the header of each file. The numerical value in the header is then used to choose files to be processed or presented in the desired order.

In a preferred embodiment of our invention, an unsigned integer is used to store the numerical value. It is desirable to have a large maximum numerical value in order to provide a sufficient range of numbers for the operation of the invention. This desire for a large maximum numerical value is balanced by the need for storage of each numerical value in the file header. Assuming that the machine implementation of an unsigned integer uses thirty-two bits, the maximum numerical value would be 4294967295.

The procedure for positioning a new file or for re-positioning an existing file is the same with regard to obtaining a proper numerical value. Where a file is being re-positioned, the new numerical value will replace a former numerical value. The discussion of obtaining a numerical value for a new file also applies to the repositioning of a file.

Where a new file is to be positioned in sequence between existing files the proper numerical value for the new file is obtained by applying the formula $$NumVal = ((SuccVal - PredVal)/2) + PredVal$$

Where NumVal is the numerical value to be assigned to the new file, SuccVal is the numerical value of the file which will follow the new file in sequence, and PredVal is the numerical value of the file which will precede the new file in sequence.

One or more new files may be placed as a group between two existing files by using numerical values obtained by applying the formula $$NumVal_n = (n(SuccVal - PredVal)/(n_{max} + 1)) + PredVal$$

Where n is the number of the new file within a group of new files, $n_{max}$ is the count of new files to be placed as a group, SuccVal is the numerical value from the existing file which will follow the new file or group of new files in sequence, and PredVal is the numerical value from the existing file which will precede the new file or group of new files in sequence.

For example, where one new file is to be positioned between existing files having numerical values of 2000 and 3000, the numerical value for the new file would be (1(3000-2000)/(1+1))+2000, which is 2500. Where four new files are to be positioned between existing files having numerical values of 2000 and 3000, the numerical value for the second new file would be (2(3000-2000)/(4+1))+2000, which is 2400, and the numerical value for the third new file would be (3(3000-2000)/(4+1))+2000, which is 2600.

An initial ordering of files may be made by applying the above formula for inserting one or more new files and setting the value of PredVal to zero and the value of SuccVal to the maximum numerical value. For example, to create an initial ordering of seven files, where the maximum numerical value is 4294967295, the numerical value for the first file would be (1(4294967295-0)/(7+1))+0, which is 536870911, the numerical value for the fifth file would be (5(4294967295-0)/(7+1))+0, which is 2684354555, and the numerical value for the seventh file would be (1(4294967295-0)/(7+1))+0, which is 3758096377.

In operation, referring to FIG. 1, the number of new or re-positioned files to be positioned is assigned to $n_{max}$ 101. The numerical value from the header of the file immediately preceding the desired position is assigned to PredVal 102. The numerical value from the header of the file immediately succeeding the desired position is assigned to SuccVal 103. The counter n is set to 1 104. The numerical value for the first file to be positioned is derived by applying the formula $$NumVal_n = (n(SuccVal - PredVal)/(n_{max} + 1)) + PredVal$$

and that numerical value is placed in the header of the file being positioned 105.

The counter n is then incremented 106. If n is not greater than $n_{max}$ 107, then there is another file to be positioned, and the numerical value for the next file is derived by applying the above formula 105, after which the counter n is incremented 106 and the test for another file to be positioned is applied again 107. If counter n is greater than nmax 107, then there is not another file to be positioned and the assignment of numerical values is finished 108.

While this invention has been described in detail with particular reference to its preferred embodiments, the principles and modes of operation of the invention have been described in this specification. The invention should not be construed as being limited to the particular forms disclosed, which are illustrative rather than restrictive. Modifications, variations, and changes may be made by those skilled in the art without departure from the spirit and scope of the invention as described by the following claims.

We claim:

1. A computer-implemented method of defining a sequence of files comprising:

obtaining two or more files;

placing a sequence identification number in the header of each of the two or more files, the assignment of each sequence identification number being made in such a way as to leave many unassigned numbers between the assigned sequence identification numbers;

allowing the subsequent assigning of sequence identification numbers between the previously assigned sequence identification numbers;

re-ordering a sequence of two or more files based on the assigned sequence identification numbers.

2. A computer-implemented method for defining the position, within a sequence of files, of at least one newly-positioned file, the method consisting of determining a numerical value NumVal from $(n(SuccVal-PredVal)/(n_{max}+1))+PredVal$, where n is the number of each newly-positioned file within a group of newly-positioned files, $n_{max}$ is the count of newly-positioned files to be positioned as a group, SuccVal is the numerical value from the existing file which will immediately follow the newly-positioned file or group of files, and PredVal is the numerical value from the existing file which will immediately preceed the newly-positioned file or group of files;

assigning the numerical value NumVal to the newly-positioned file; and repeating the determining and assigning of the numerical value NumVal for subsequent newly-positioned files in a group until all newly-positioned files in a group have been assigned a numerical value, wherein the numerical value NumVal defines the positions of the newly-positioned files.

3. The method of claim 2, wherein the numerical value of only one newly-positioned file is determined and the value of n is 1 and the value of $n_{max}$ is 1.

4. The method of claim 2, wherein the at least one newly-positioned file is positioned in an initially empty sequence of files, the numerical value of SuccVal is a maximum numerical value and the numerical value of PredVal is zero.

5. The method of claim 4, wherein the maximum numerical value is 4292967295.

6. A system for sequencing files, the system comprising:

a first file having an associated numerical value PredVal;

a second file having an associated numerical value SuccVal; and means for positioning, in a defined sequence, at least one newly-positioned file, each newly-positioned file being assigned an associated numerical value NumVal equal to $(n(SuccVal-PredVal)/(n_{max}+1))+PredVal$, where n is the number of each newly-positioned file within a group of newly-positioned files, $n_{max}$ is the count of newly-positioned files to be positioned as a group, SuccVal is the numerical value from the existing file which will immediately follow the newly-positioned file or group of files, and PredVal is the numerical value from the existing file which will immediately preceed the newly-positioned file or group of files.

7. The system of claim 6, wherein only one newly-positioned file is comprised, the value n is 1 and the value of $n_{max}$ is 1.

8. The system of claim 6, wherein the system of sequenced files is initially empty, the first file is null, the numerical value of SuccVal is a maximum numerical value, the second file is null, and the numerical value of PredVal is zero.

9. The system of claim 6, wherein the maximum numerical value is 4294967295.

* * * * *

UNITED STATES PATENT AND TRADEMARK OFFICE
CERTIFICATE OF CORRECTION

PATENT NO. : 6,785,694 B1
DATED : August 31, 2004
INVENTOR(S) : Brett Graffin et al.

It is certified that error appears in the above-identified patent and that said Letters Patent is hereby corrected as shown below:

Column 3,
Line 4, after "of" insert -- : -- (colon).

Signed and Sealed this

Twenty-first Day of December, 2004

JON W. DUDAS
*Director of the United States Patent and Trademark Office*